United States Patent
Kieffel et al.

(10) Patent No.: US 11,996,251 B2
(45) Date of Patent: May 28, 2024

(54) GAS INSULATING DEVICE WITH ANTI-LIQUIFICATION MEANS

(71) Applicant: General Electric Technology GmbH, Baden (CH)

(72) Inventors: Yannick Kieffel, Villeurbanne (FR); François Biquez, Villeurbanne (FR); Thomas Berteloot, Villeurbanne (FR)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/764,944

(22) PCT Filed: Sep. 22, 2020

(86) PCT No.: PCT/EP2020/076450
§ 371 (c)(1),
(2) Date: Mar. 29, 2022

(87) PCT Pub. No.: WO2021/063753
PCT Pub. Date: Apr. 8, 2021

(65) Prior Publication Data
US 2022/0359138 A1 Nov. 10, 2022

(30) Foreign Application Priority Data
Sep. 30, 2019 (EP) .................................. 19290098

(51) Int. Cl.
*H01H 33/56* (2006.01)
*H02B 13/045* (2006.01)
*H02B 13/055* (2006.01)

(52) U.S. Cl.
CPC ........ *H01H 33/562* (2013.01); *H01H 33/565* (2013.01); *H02B 13/045* (2013.01); *H02B 13/055* (2013.01)

(58) Field of Classification Search
CPC .. H01H 33/562; H01H 33/565; H01H 33/563; H01H 33/57; H01H 2033/566;
(Continued)

(56) References Cited

U.S. PATENT DOCUMENTS

| | | | | |
|---|---|---|---|---|
| 4,006,332 A | * | 2/1977 | Crookston | ........... H01H 33/562 218/83 |
| 4,219,725 A | * | 8/1980 | Groninger | ................. F17C 7/04 62/48.1 |

(Continued)

OTHER PUBLICATIONS

International Search Report Re: PCT Application No. PCT/EP2020/076450 (dated Apr. 8, 2021).
(Continued)

*Primary Examiner* — William A Bolton
(74) *Attorney, Agent, or Firm* — Eversheds Sutherland (US) LLP

(57) ABSTRACT

A medium or high voltage electrical device and method of maintaining the composition of an insulating gas mixture in a medium or high voltage electrical device, where the device comprises a sealed chamber, said sealed chamber comprising electrical components; a gas mixture ensuring electrical insulation and/or extinguishing of electrical arcs produced in this chamber, wherein the gas mixture comprises at least one insulating gas and at least one dilution gas; and a receptacle, said receptacle comprising an opening, at least one wall, wherein at least one wall is a heatable wall, and wherein said receptacle is positioned to receive liquefied gas; the device further comprising a heating element for heating the heatable receptacle wall; and a dielectrically and thermally insulating layer located between the heatable receptacle wall and the chamber.

11 Claims, 1 Drawing Sheet

(58) Field of Classification Search
CPC ....... H01H 2033/567; H01H 2033/568; H02B 13/045; H02B 13/055; H02B 13/035
USPC .................................. 218/68, 85, 86, 88–91
See application file for complete search history.

(56) References Cited

U.S. PATENT DOCUMENTS

| | | | |
|---|---|---|---|
| 4,434,335 A | 2/1984 | Natsui et al. | |
| 7,102,101 B1 * | 9/2006 | Johnson | H01H 33/562 392/447 |
| 8,709,303 B2 * | 4/2014 | Mahdizadeh | H02B 1/21 252/573 |
| 10,121,619 B2 * | 11/2018 | Vladuchick | H01H 33/64 |
| 2004/0089335 A1 * | 5/2004 | Bingham | F17C 7/04 136/203 |
| 2013/0277334 A1 * | 10/2013 | Mantilla | H01H 33/22 252/571 |
| 2014/0083737 A1 | 3/2014 | Piccoz et al. | |

OTHER PUBLICATIONS

Written Opinion Re: PCT Application No. PCT/EP2020/076450 (dated Apr. 8, 2021).

* cited by examiner

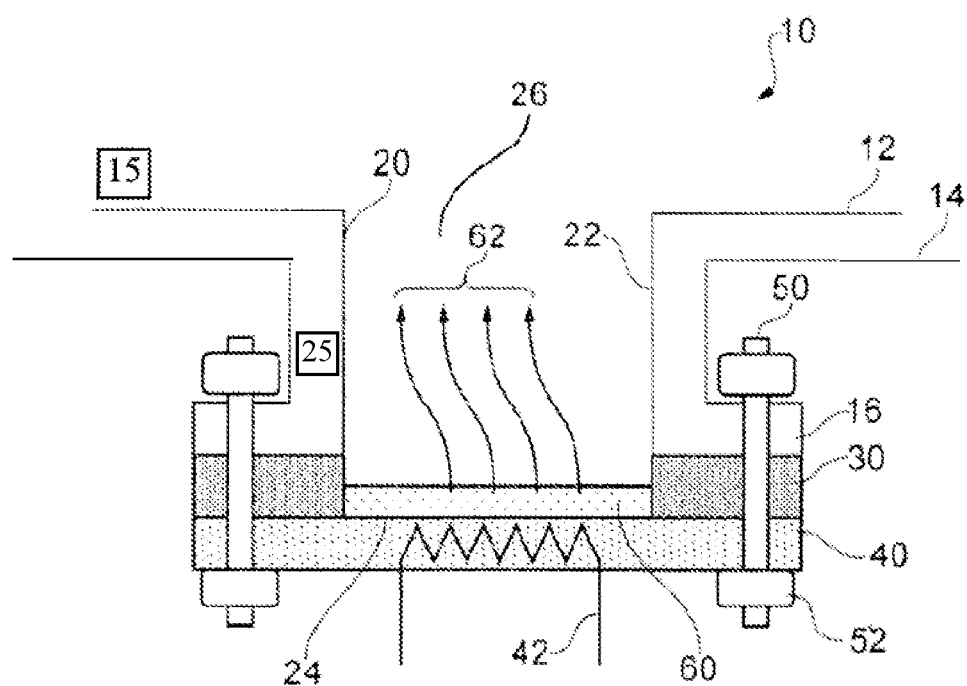

GAS INSULATING DEVICE WITH ANTI-LIQUIFICATION MEANS

CROSS-REFERENCE TO RELATED APPLICATIONS

The present application is a 371(c) National Stage Entry of PCT Application No. PCT/EP2020/076450, filed on Sep. 22, 2020, which claims priority to European Patent Application No EP 19290098.3 dated Sep. 30, 2019, the contents of which are incorporated by reference herein.

BACKGROUND

The present invention relates to a medium- or high-voltage electrical device comprising an insulating gas mixture and means for maintaining the gas composition, and methods thereto.

In many medium- and high-voltage electrical devices, electrical insulation and electric arc extinction may be performed by an insulating gas within a sealed device. This insulating gas must have relatively high dielectric strength, have good thermal conductivity and low dielectric losses. One commonly used insulating gas is $SF_6$. Another insulating gas used in medium and high voltage devices comprises a mixture of heptafluoroisobutyronitrile and a dilution gas. However, at low temperatures, the insulating gas may liquefy, thus decreasing the concentration of gaseous insulating gas in the electrical device, and may thereby potentially affect the isolation properties of the device.

Once liquefied, the liquid may not immediately return to the gas phase upon an increase of the temperature in the electrical device. This may be the case if the entire electrical device is heated. This is because the transition from liquid to gas is an endothermic process, cooling down the liquid and thereby slowing down the evaporation of the liquid to gas.

Methods and devices are known to heat the entire enclosure of a gas insulated electrical device above the liquefaction temperature of the insulating gas. These methods and devices however induce a large amount of heat loss and consume substantial amounts of energy to keep the entire equipment at a constant temperature.

There is therefore a need for improved apparatus and method for maintaining the composition of insulating gas mixtures at low temperatures.

SUMMARY OF THE INVENTION

The present invention is defined in the accompanying claims.

In one aspect, the present invention provides a medium or high voltage electrical device comprising a sealed chamber, said sealed chamber comprising electrical components; a gas mixture ensuring electrical insulation and/or extinguishing of electrical arcs produced in this chamber, wherein the gas mixture comprises at least one insulating gas and at least one dilution gas; and a receptacle, said receptacle comprising an opening, at least one wall, wherein at least one wall is a heatable wall, and wherein said receptacle is positioned to receive liquefied gas; the device further comprising a heating element for heating the heatable receptacle wall; and a dielectrically and thermally insulating layer located between the heatable receptacle wall and the chamber.

In a second aspect, the present invention provides a method of maintaining the composition of an insulating gas mixture in a medium or high voltage electrical device, wherein the gas mixture ensures electrical insulation and/or extinguishing of the electrical arcs produced in the device, wherein the device is a device according to the first aspect, wherein the device further comprises a temperature, liquid and/or pressure sensor, the method comprising the steps of
a. collecting liquified gas in a receptacle;
b. heating the liquified gas collected in the receptacle with a heating element when the temperature or pressure drops below a threshold temperature or pressure, or the liquid level rises above a threshold level.

SUMMARY OF THE FIGURES

The invention may be put into practice in various ways and a number of specific embodiments will be described by way of example to illustrate the invention with reference to the accompanying figures, in which:

FIG. 1 shows a cross section of a device in accordance with the present disclosure.

DETAILED DESCRIPTION

The meaning of terms used herein are explained below, and the present invention will be described in detail.

As used herein, the term "medium voltage" and "high voltage" are used in the conventionally accepted manner. In other words, the term "medium voltage" refers to a voltage that is greater than 1000 volts (V) for AC and 1500 V for DC, but that does not exceed 52 000 V for AC or 75 000 V for DC. The term "high voltage" refers to a voltage that is strictly greater than 52 000 V for AC and 75 000 V for DC.

As used herein, the term "comprises" means "includes", but is not limited to any specified constituent component, process step or the like. The term "comprises" encompasses, without limitation, instances which "consists essentially of" any specified constituent component, process step or the like.

The terms gas, insulating gas, gas mixture and gas insulating mixture may be used herein interchangeably.

The gas mixture or gas insulation may be a gas mixture including a fluorinated compound. For example, the fluorinated compound may be heptafluoroisobutyronitrile. Other possible fluorinated compounds may be 1,1,1,3,4,4,4-heptafluoro-3-(trifluoromethyl)-2-butanone $(CF_3C(O)CF(CF_3)_2)$, 2,3,3,3-tetrafluoropropene (HFO-1234 yf), 1,3,3,3-tetrafluoropropene (HFO-1234ze) or fluorooxirane. Combinations of any of these gases may also be used.

Heptafluoroisobutyronitrile, also known herein as $iC_3F_7CN$, has a formula (I) of $(CF_3)_2CFCN$ and corresponds to 2,3,3,3-tetrafluoro-2-trifluoromethyl propanenitrile, having CAS number 42532-60-5. It has a boiling point of $-4.9°$ C. at 1013 hPa (boiling point measured in accordance with ASTM D1120-94 "Standard Test Method for Boiling Point of Engine Coolants").

The gas mixture may comprise a fluorinated compound and a dilution gas. Preferably, the gas mixture comprises heptafluoroisobutyronitrile and a dilution gas.

A dilution gas is a natural gas or gas mixture having a global warming potential (GWP) that is very low, or even zero. The dilution gas may be carbon dioxide, having a GWP that is equal to 1, nitrogen, oxygen, or air, advantageously dry air, having a GWP that is equal to 0, or mixtures thereof. A dilution gas may be selected from the list consisting of carbon dioxide, nitrogen, oxygen, air (80% $N_2$ and 20% $O_2$), advantageously dry air, and any mixture thereof.

The gas mixture may comprise at least 80% by volume and preferably, at least 90% by volume of carbon dioxide.

Advantageously, heptafluoroisobutyronitrile may be used in a mixture with carbon dioxide and oxygen.

The apparatus or device 10 of the present invention comprises a housing defining a leaktight insulating space or sealed chamber and electrical active part(s), or electrical component(s), arranged in the insulating space. As used herein, the terms leaktight insulating space, insulating space and sealed chamber are used interchangeably. The insulating space may comprise a gas insulation mixture. The gas insulating mixture may comprise heptafluoroisobutyronitrile, as described above.

The terms "electrical active part" and "electrical component 15" may be used interchangeably. They are to be interpreted broadly and may include a conductor, a conductor arrangement, a switch, a conductive component, a surge arrester, and the like. In particular, the apparatus of the present invention includes a switchgear, and in particular a gas-insulated encapsulated switchgear, or a part and/or component thereof, in particular a bus bar, a bushing, a cable, a gas-insulated cable, a cable joint, a current transformer, a voltage transformer, a surge arrester, an earthing switch, a disconnector, a load-break switch, and/or a circuit breaker. The switchgear may be a metal encapsulated switchgear.

When the apparatus is used outdoors, low ambient temperature cools the housing, including the housing walls and chamber walls. This also cools the insulating gas mixture within the housing. The insulating gas may condense along the walls of the apparatus, generating a gradient or variation in concentration of the gas as well as a change in the insulating properties of the insulating gas.

The gradient and/or variation in the concentration of the gas may be avoided by having an electrical device comprising a sealed chamber comprising electrical components and a receptacle within the chamber for collecting liquified gas as well as a heating element for reheating the liquified gas in a localised environment.

The device 10 comprises a sealed chamber 12. By sealed, it is meant that the chamber 12 is leak proof to the gases included therein. The sealed chamber 12 comprises a central shell having a length extending between two end portions. In one embodiment, the chamber 12 has a cylindrical shape. In another embodiment, the chamber 12 has another geometrical shape. The chamber 12 comprises an upper portion and a bottom portion, or bottom. The bottom portion is located in the proximity of the lowest point in the chamber 12. The bottom portion of the chamber 12 comprises a surface which is the called the chamber floor. The chamber floor is a surface within the device 10 which is in the proximity to the lowest point in the chamber 12. The upper portion is located in the proximity of the highest point in the chamber 12.

As shown in FIG. 1, the device 10 comprises a receptacle 20 in the chamber 12. The receptacle 20 is positioned in the chamber 12 to receive condensed or liquefied insulating gas. In one embodiment, at least one wall of the chamber 12 is sloped towards the receptacle 20, such that liquid flowing down the walls of the chamber 12 with gravity flow towards and into receptacle 20. For example, a part of a wall in chamber 12 may be formed in the shape of a condensing finger, directing liquid to flow down the sides of the finger and into receptacle 20.

The receptacle 20 comprises at least one wall 22. The receptacle 20 may comprise a receptacle bottom wall, or floor 24. The receptacle wall 22 may be adjacent to the receptacle floor 24.

At least one receptacle wall is heatable. The heatable wall may be in the proximity to a heating element 42. The heatable wall may be adjacent to a heating element 42. The heatable wall may comprise a heating element 42. The heating element 42 may be integral with the heatable wall.

The receptacle 20 further comprises an opening 26 which is in communication with the chamber. The communication between the opening 26 and the chamber 12 may be direct communication. The receptacle opening 26 may be flush with the chamber floor.

The receptacle wall(s) 22 may extend below the chamber floor. The receptacle wall(s) 22 may form a recess or receptacle 20 within the chamber floor to collect liquified gas 60. The receptacle walls 22 may be integral with the chamber floor.

The receptacle 20 may be a branch pipe or a hand hole with a cover. As used herein, the terms branch pipe and hand hole may be used interchangeably. The branch pipe may be cylindrical in shape. The branch pipe may form a receptacle wall 22. The branch pipe wall may be a heatable wall. The branch pipe may comprise an opening 26 opposite to its attachment at the chamber floor. The opening may be diametrically opposite to the attachment point to the chamber floor or the branch pipe opening 26 flush with the chamber floor. The branch pipe may extend downwards away from the floor of the sealed chamber 12. The branch pipe may be provided with an end segment with a flange joint 16 surrounding the branch pipe opening 26, opposite to the chamber floor.

The branch pipe opening 26 opposite to the chamber floor may be closed with a branch pipe cover or lid 40 to form a receptacle floor 24. The cover or lid 40 may be removably attached to the branch pipe. The branch pipe cover 40 may be a heatable wall. The branch pipe cover 40 may comprise a heating element 42. The heating element 42 may be integrally built into the branch pipe cover 40. The heating element 42 may be attached to the branch pipe cover 40.

In some embodiments, the receptacle 20 may be a channel extending along part or all of the chamber floor. The channel may be a semi-circular channel. The channel floor may be the heatable wall. The channel may also comprise two side walls and a floor. In this embodiment, the channel floor and/or the channel wall may be the heatable wall.

The receptacle may be configured to maximize the surface area of the liquefied gas within it. This allows the optimization of the area available for gas-liquid reevaporation/exchange. The surface area of the liquid in the receptacle may range from about 10 cm$^2$ to about 5000 cm$^2$, from about 50 cm$^2$ to about 2500 cm$^2$, from about 75 cm$^2$ to about 1000 cm$^2$. The receptacle may be further configured such that the depth of the liquefied gas in the receptacle is minimized. The depth of the liquid in the receptacle may range from about 0.1 cm to about 50 cm, from about 1 cm to about 35 cm, from about 5 cm to about 25 cm.

The receptacle may have a volume which is less than about 10%, less than about 15%, less than about 20%, less than about 25% of the total volume of the electrical device.

A dielectrically and thermally insulating layer 30 is located between the heatable receptacle wall and the chamber 12. The insulating layer 30 may be a washer. The insulating layer 30 enables the isolation of the heatable receptacle wall from the chamber walls. This isolating layer 30 thus prevents the heating of the entire chamber 12, which reduces the energy consumption of the device and effectively only heats the liquid in the receptacle 20 to reevaporation. The insulating layer may be made from polyethylene, polyfluoroethylene, polyamide, polypropylene, polystyrene, polycarbonate, polymethyl methacrylate, polysulfone, polyetherimide, polyether ether ketone, parylene N™, Nuflon™, silicone, and epoxy resin.

Preferably, the receptacle 20 is not located in the proximity of an electrical active component, i.e. away from areas with high electrical gradients. This is to avoid possible electrical discharge. In one embodiment, the receptacle 20 is not located directly beneath electrical components.

The heating element 42 is coupled to a power supply, which is operative to supply power to the heating element 42. The power supply may be modulatable, i.e. it may modulate the power supplied to the heating element 42. The heating element 42 may be resistance heating powered by the power supply. The power supply may be battery or powered by the network.

In some embodiments, the branch pipe flange 18, insulating layer 30 and branch pipe cover 40 may be held together in place with at least one bolt 50.

The receptacle 20 may further be fitted with a sensor 25 such as at least a temperature sensor, a pressure sensor and/or a liquid sensor. The chamber may comprise at least a temperature sensor, a pressure sensor and/or a liquid sensor. The sensors may be coupled to a controller. The controller is operative to receive output signals from one or more of the sensors and then modulate the power to the heating element 42.

The temperature sensor may be used to monitor the temperature within the receptacle and/or chamber. The temperature sensor may also monitor the ambient temperature, i.e. the temperature in the vicinity of the device 10. The pressure sensor may be used to monitor the gas pressure within the receptacle and/or gas insulated switchgear. The liquid sensor may be used to monitor the presence and/or amount of condensed gas collected within the receptacle.

The operation of the heating means 42 may be dependent on the read-out data from the temperature sensor, pressure sensor and/or liquid sensor. The heating means 42 may be modulatable.

In one embodiment, the receptacle 20 may be heated continuously by keeping the heating element 42 continuously on. In another embodiment, the heating element 42 is only turned on when the temperature sensor in the receptacle 20 or in the chamber 12 falls below a predetermined threshold temperature.

The predetermined threshold temperature may be about 5° C., 10° C., 15° C. or 20° C. above the gas liquefaction temperature. The threshold temperature is dependent on the pressure of the gas on filling the chamber 12. It can be calculated using the pressure-temperature curve of the filling gas mixture.

The heating element 42 may be turned on when the liquified gas in the receptacle 20 reaches above a threshold level, as sensed with a liquid sensor.

The heating element 42 may be turned on when the pressure within the chamber 12 falls below a threshold pressure. The threshold pressure may be calculated using the pressure-temperature curve for the filling gas mixture.

The liquefaction temperature of heptafluoroisobutyronitrile depends on its pressure in the device 10. The liquefaction temperature of a gas can be calculated based on its pressure curve. Below the liquefaction temperature, heptafluoroisobutyronitrile undergoes condensation out of the gas phase. The heptafluoroisobutyronitrile gas may condense on the coldest parts of the enclosure, for example on the walls of the gas insulated electrical device 10. The condensate may then flow down the walls of the device 10 into the receptacle 20, which may be located at the lowest point in the leakproof chamber 12 of the gas insulated device 10. The condensate may also be collected via condensing fingers positioned in the chamber 12 above the receptacle 20. The liquefied heptafluoroisobutyronitrile is recovered in the receptacle 20 using gravity. The liquefied gas may then be heated locally in the receptacle 20 to reevaporate to a gas phase 62.

In a method of maintaining the composition of an insulating gas mixture in a medium or high voltage electrical device 10, the method comprises the steps of collecting liquefied gas in a receptacle 20, and heating the liquified gas in the receptacle 20 with a heating element 42 when the temperature or gas pressure drops below a threshold temperature or pressure, or if the liquid level rises above a threshold level.

The heating of the condensate to evaporation in a receptacle 20 is advantageous because it requires the heating of a small area. In addition, as the receptacle 20 is small compared to the sealed chamber 12, the localised temperature within it is higher than within the entire apparatus 10. This counterbalances the endothermic effect of vaporisation, providing an additional energy boost to push the condensate to evaporate. In addition, when the gas is reevaporated, the convection occurring on reevaporation allows the mixing of the gas within the gas mixture in the apparatus 10. This enables the gas composition to remain stable at temperatures below the condensing temperature of the condensable gas.

As at least one of the walls of the recess or receptacle 20 is heated, this allows the heptafluoroisobutyronitrile condensate to reevaporate.

Electrical devices 10 using alternative insulating gases, such as $SF_6$, may be retrofitted for use with heptafluoroisobutyronitrile as an insulating gas. In some embodiments, electrical devices containing those alternative gases may be retrofitted to include a receptacle according to the present disclosure. In such a retrofit, the gas-tight enclosure 12 of the electrical device 10 may be adapted to include a receptacle 20 according to the present invention. This may include fitting a branch pipe on the existing structure with a thermally and insulating washer 30 and a lid 40 comprising a heating element 42.

All features of each aspects of the invention as described above can be applied to other aspects of the invention mutatis mutandis.

The invention claimed is:

1. A medium or high voltage electrical device, comprising:
    a sealed chamber, the sealed chamber comprising:
    electrical components;
    a gas mixture ensuring electrical insulation and/or extinguishing of electrical arcs produced in this sealed chamber, wherein the gas mixture comprises at least one insulating gas and at least one dilution gas; and
    a receptacle, the receptacle comprising an opening, at least one wall, wherein at least one wall is a heatable receptacle wall, and wherein the receptacle is positioned to receive liquefied gas;
    the device further comprising a heating element for heating the heatable receptacle wall; and
    a dielectrically and thermally insulating layer located between the heatable receptacle wall and the sealed chamber.

2. The device of claim 1, wherein at least one wall of the chamber is sloped towards receptacle, allowing liquefied gas to flow into the receptacle.

3. The device of claim 1, wherein the receptacle is positioned at a bottom of the chamber.

4. The device of claim 1, wherein the heating element is adjacent to the heatable receptacle wall.

5. The device of claim 1, wherein the heatable wall comprises the heating element.

6. The device of claim 1, further comprising a temperature, liquid and/or pressure sensor for monitoring the temperature, liquid level and pressure within the device.

7. The device of claim 1, wherein the receptacle is positioned away from the electrical components.

8. A method of maintaining a composition of the insulating gas mixture in the medium or high voltage electrical device, wherein the gas mixture ensures electrical insulation and/or extinguishing of the electrical arcs produced in the device, wherein the device is according to claim 1, wherein the device further comprises a temperature, liquid and/or pressure sensor, the method comprising the steps of:
 collecting liquified gas in the receptacle; and
 heating the liquified gas collected in the receptacle with the heating element when the temperature or pressure drops below a threshold temperature or pressure, or the liquid level rises above a threshold level.

9. The method of claim 8, wherein the threshold temperature is below −5° C., −10° C., −15° C., −20° C., −25° C., or −30° C.

10. The method of claim 8, wherein the gas mixture comprises a fluorinated compound selected from the list consisting of heptafluoroisobutyronitrile, 1,1,1,3,4,4,4-heptafluoro-3-(trifluoromethyl)-2-butanone (CF3C(O)CF(CF3)2), 2,3,3,3-tetrafluoropropene (HFO-1234 yf), 1,3,3,3-tetrafluoropropene (HFO-1234ze), fluorooxirane, or any combination thereof.

11. The device of claim 1, wherein the gas mixture comprises a fluorinated compound selected from the list consisting of heptafluoroisobutyronitrile, 1,1,1,3,4,4,4-heptafluoro-3-(trifluoromethyl)-2-butanone (CF3C(O)CF(CF3)2), 2,3,3,3-tetrafluoropropene (HFO-1234 yf), 1,3,3,3-tetrafluoropropene (HFO-1234ze), fluorooxirane, or any combination thereof.

* * * * *